United States Patent [19]

Kennedy, Sr. et al.

[11] 4,451,537

[45] May 29, 1984

[54] ASBESTOS COMPOSITION HAVING ORGANO-SILANE COATING

[75] Inventors: Robert J. Kennedy, Sr., Niagara Falls; Robert J. Kennedy, Jr.; Sundaresan Ramachandran, both of N. Tonawanda, all of N.Y.

[73] Assignee: Union Carbide Corporation, Danbury, Conn.

[21] Appl. No.: 279,157

[22] Filed: Jun. 30, 1981

[51] Int. Cl.$^3$ .......................... B32B 5/16; B05D 1/18; C07F 7/10
[52] U.S. Cl. ................... 428/391; 252/8.5 C; 427/220; 427/309; 427/387; 427/399; 428/405; 428/429; 428/443; 428/447; 523/212; 523/213; 524/452
[58] Field of Search ............... 428/443, 429, 447, 410, 428/446, 391, 405; 260/42.15; 427/220, 309, 387, 399; 252/8.5 C; 523/212, 213; 524/452–455

[56] References Cited

U.S. PATENT DOCUMENTS

| | | | |
|---|---|---|---|
| 3,535,150 | 10/1970 | Lipsett | 428/443 |
| 3,702,783 | 11/1972 | Hartlein | 427/215 |
| 4,183,814 | 1/1980 | Ramachandran | 556/410 |
| 4,214,914 | 7/1980 | Ivanchor | 428/405 |
| 4,216,024 | 8/1980 | Ivanchor | 428/405 |
| 4,233,366 | 11/1980 | Sample | 428/443 |
| 4,344,992 | 8/1982 | Ramachandran | 252/8.5 C |

FOREIGN PATENT DOCUMENTS 2546061 10/1975 Fed. Rep. of Germany .

OTHER PUBLICATIONS

Journal of Applied Chemistry, vol. 20, pp. 76–79, 3/30 by H. Edwards.

Primary Examiner—Ellis P. Robinson
Attorney, Agent, or Firm—John R. Doherty

[57] ABSTRACT

A crysotile asbestos base material having an organo-silane outer coating bonded thereto.

6 Claims, No Drawings

ASBESTOS COMPOSITION HAVING ORGANO-SILANE COATING

This invention relates to an asbestos base composition. More particularly, this invention relates to a chrysotile asbestos base material which can be used to enhance the rheological properties of fluids such as oil drilling muds and also in reinforcing polyolefins, thickening polyester resins, vinyls and rubbers.

Chrysotile asbestos, as it naturally occurs, may be generally defined as a hydrous magnesium hydroxide. In contact with polar liquids, asbestos exhibits a strong positive charge and thereby attracts anions and thus can be used in removal of detergents from liquids; asbestos, in the natural state, is also highly effective as a flocculating agent for minerals such as titanium dioxide and clays. It has been proposed in German Patent Publication No. 2,546,061 to provide asbestos, and other minerals, with an organo-silane coating by first acid leaching the mineral to remove the outer octahedral layer, under controlled conditions, and thereafter react the leached mineral with an organo-silane. The organo-silane coated material is described as being desirable as an additive in oil well drilling muds and as a gelling agent and reinforcing agent in resins. However, the controlled acid leaching technique described in the German Patent Publication must be carefully practiced in order to avoid excessive removal of asbestos material and present industrial needs require further improvement in the rheological properties of fluids such as oil base drilling muds.

U.S. Pat. No. 4,183,814—S. Ramachandran (Jan. 15, 1980) discloses an organo-silane coated asbestos base material, such material being provided with a precipitation deposited siliceous layer prior to the organo-silane coating. This material provides superior thickening properties in oil drilling muds while requiring lesser properties of the asbestos base material. However, the siliceous precipitation coating of the asbestos involves a significant manufacturing expense.

Accordingly, it is an object of the present invention to provide an economically advantageous asbestos base material for enhancing the rheological properties of fluids.

Other objects will be apparent from the following description and claims.

An asbestos base material in accordance with the present invention comprises opened chrysotile asbestos having an outer organo-silane coating bonded thereto.

The asbestos base material of the present invention is produced by providing in an aqueous media, uncoated, untreated opened chrysotile asbestos and providing in the aqueous media a pH of about 10-12, by the addition of suitable caustic reagents, and adding an organo-silane to provide an organo-silane coating chemically bonded on the outer surface of the chrysotile asbestos.

In a particular embodiment of the method of the present invention, opened[1] particular chrysotile asbestos is provided, such as that available commercially as High Purity Grade Asbestos from Union Carbide Corporation. This asbestos is slurried with water, the slurry conveniently containing from about 0.5% to 4% by weight asbestos and more suitably about 1-2% asbestos by weight. A predetermined amount of caustic reagent, e.g. NaOH, suitably an amount which provides a pH of 10 to 12, is added to the slurry.

[1] Opened particulate asbestos refers to particulate asbestos in which the naturally occurring fiber bundles have been separated into their ultimate individual fibers to the extent that most of the constituent particles are in the form of individual fibrils.

Following the addition of caustic reagent an organo-silane is added to the slurry in an amount of about 1 to 8 percent by weight of the asbestos base material in the slurry. The thus treated asbestos is recovered and dried by conventional techniques. The resulting asbestos material has a coating of organo-silane over-lying the asbestos base material.

The properties of the organo-silane coated material of the present invention are influenced by the particular organo-silane employed. For example, octyl triethoxy silane provides an oleophilic coating which has a positive interaction with oil base fluids, such as drilling muds, and improves the rheological properties of these fluids as hereafter described. The organo-silanes used in the practice of the present invention are substantially as described in the above-noted German Patent Publication and are characterized by one of the two following structures:

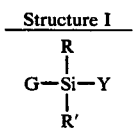

Structure I where G is a hydroxyl group or a group hydroxyzable to hydroxyl such as, for example, alkoxy or halogen; Y is an alkyl group containing from 1 to 20 carbon atoms, a phenyl group, an alkyl substituted phenyl group where the alkyl groups can contain a total of from 1 to 12 carbon atoms or a polyoxylakylene radical having up to 25 carbon atoms bonded to the silicon atom by a silicon to carbon bond, R and R' are selected from the group described by G and Y or hydrogen; or:

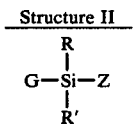

Structure II where G is a hydroxyl group or a group hydroxyzable to hydroxyl such as, for example, alkoxy or halogen; Z is an alkyl group containing from 1 to 20 carbon atoms bearing a functional group such as, for example, amino, oxirane, mercapto or acryloxy; R and R' are selected from the groups described by G and Z, hydrogen, an alkyl group containing from 1 to 20 carbon atoms, phenyl, or alkyl substituted phenyl where the alkyl groups can contain a total of from 1 to 12 carbon atoms.

The following examples will further illustrate the present invention.

EXAMPLE I

Short fiber chrysotile asbestos from the Coalinga, Calif. deposit, obtained from Union Carbide Corporation under the designation High Purity Grade and having the properties shown in Table A was added to water, at 31° C. in an amount of about 1.5% by weight.

TABLE A

| | | |
|---|---|---|
| Specific surface area | m.$^2$/gm | 60–80 |
| | | 60–80 |
| Magnetite content | percent | 0.04–0.5 |
| Reflectance | percent | 72–78 |

Specific surface area is calculated from adsorption data using the BET (Brunauer, Emmet, Teller) method as described in Brunauer, "The Adsorption of Gases and Vapors," Princeton University Press (1945).

Magnetite content is measured by permeametric device patterned after ASTM standard method D-1118-57. However, because the lower limit of detection of the ASTM device is only about 0.20% magnetite, the ASTM method has been improved with respect to sensitivity to measure a limit of detection of 0.005% magnetite, and the range extended to measure 0.10% magnetite in the mid-scale of the instrument. In order to obtain this greater range and improved sensitivity, the ASTM method has been modified to detect the phase changes of the current generated when magnetic materials are placed in a transformer core rather than the voltage changes generated.

Reflectance is measured on a sample prepared according to TAPPI (Technical Association of the Pulp and Paper Industry) standard T-452-m-58 and reported as percent of ultimate reflectance based on magnesium oxide as 100% reflectance.

A NaOH aqueous solution was prepared by adding 1.87 grams of NaOH to 2500 ml of $H_2O$. Twenty-five grams of asbestos were added to the solution in a large Waring Blendor[2] and the blender was run at its highest speed for about 3 minutes. This mixture had a pH of about 11.
[2]Model No. CB5.

After this step, 1.5 grams of octyl triethoxy silane was added to the slurry which was mixed further in a separate container for about 10 minutes. The solids were removed by filtration and dried at about 110° C. for about 3 hours. The resulting product had an oleophilic organo-silane coating overlying and chemically bonded to the opened chrysotile asbestos.

A particular embodiment of the present invention is the use of the material of the present invention as an additive to conventional and well known drilling fluids used as drilling muds in oil and gas well drilling operations. In connection with this embodiment material prepared as in Example I was opened in a Waring blender (Model 91-264) at high speed for about 30 seconds. It was then employed, in the proportions shown in Table I, as an additive in a standard oil base fluid (drilling mud) having the following composition:
332.5 ml of No. 2 Diesel Oil
17.5 ml of Water
The actual amounts of the additions were 7 and 14 gm.

The testing procedure for viscosity evaluation of the drilling mud was as follows:

The oil and water were mixed at high speed in a Waring blender (Model No. 91-264) for 2 minutes prior to the addition of the prepared asbestos base material of Example I. Following the addition, stirring was continued in the blender, also at high speed, for 10 minutes, after which time, the sample was removed to a Fann Viscometer (Model No. 35A), cooled to 115° F. (46° C.) and the viscosity and gel strengths determined using standard procedures.* The results are shown in Table I.
*As described in American Petroleum Institute Publication No. API RP 13B, fourth edition, Nov. 1972.

TABLE I

| | Effect of Asbestos Base Material of this Invention on Mud Properties | | | | |
|---|---|---|---|---|---|
| | | Fann Viscosity Results | | | |
| No. | Additive Loading (lb/bbl) | A.V. (in cps) | P.V. (in cps) | Y.P. (in no./100 ft$^2$) | Gel Strength (in. no./100 ft$^2$) Initial |
| 1 | 7 | 26 | 9 | 34 | 16 |
| 2 | 14 | 58 | 13 | 90 | 36 |

EXAMPLE II

Fifty grams of high purity asbestos (the same starting material used in Example I) were acid leached prior to silane treatment following the procedure outlined in the above cited German Patent Publication No. 2,546,061 as follows: Fifty grams of the high purity asbestos was slurried in 600 ml of water and 18 gm of 98% sulfuric acid were added and the slurry was stirred using a mechanical stirrer for 3 hours. Subsequently, 10.8 gm. of a 50% sodium hydroxide solution was added to the slurry to increase the pH to 6.5. This was followed by adding to the slurry 3 grams of octyl triethoxy silane mixed in 20 ml of methanol and mixing was continued for 16 hours. After this step, the slurry was filtered and the solids were dried at 110° C. for 3 hours. The product was then opened in a Waring blender (Model No. 91-264) for 30 seconds at high speed.

The above acid leached, silane treated sample was used as an additive and tested in a standard drilling mud composition as described in connection with the material of Example I. The results are given in Table II.

TABLE II

| | Effect of Acid Leached, Silane Treated Asbestos on Oil Mud Properties | | | | |
|---|---|---|---|---|---|
| | | Fann Viscosity Results | | | |
| No. | Additive Loading (lb/bbl) | A.V. (in cps) | P.V. (in cps) | Y.P. (in no./100 ft$^2$) | Gel Strength (in no./100 ft$^2$) Initial |
| 1 | 7 | 28.5 | 10.0 | 37 | 21 |
| 2 | 14 | 80.0 | 18.0 | 124 | 64 |

A comparison of the results of Table I and Table II reveals that the material of this invention at 7 lbs. per barrel level (Table I of Example I) has at least equal thickening properties as compared to the material of Example II. For example, as can be seen by comparing the results shown in Tables I and II an apparent viscosity of 26 cps is achieved through the practice of the present invention using additive in proportions of about 7 lbs. per bbl which is essentially the same as with the additive of Example II. Further, the gel strength provided by the present invention for an addition of 7 lbs per bbl provides gel strength comparable to that achieved with the material of Example II. At higher loadings, e.g., 14 lbs per barrel, the thickening properties of the material of the present invention, while not as high as that of Example II, are nevertheless well within the industry requirement of apparent viscosity 40 to 56 cps. The properties of the material of the present invention enable satisfactory performance of oil base drilling muds without requiring time-consuming and relatively expensive pre-treatment of the asbestos by leaching as described in German Patent Publication No. 2,546,061 or precoating as described in U.S. Pat. No. 4,183,814. The material of the present invention can be added to the oil base fluid in an amount of about 0.10 to 7% by weight, with the preferred amount being from about 0.5 to 2%. As previously mentioned, the asbestos base material of the present invention can be used as an addition to polyolefins, polyester resins, vinyls, rubbers and the like.

Drilling fluids to which material of the present invention can be added are oil base fluids, usually diesel oil, and water base fluids such as described in "Fluid Control" 12th Ed. Subcommittee of API published by Petroleum Extension Service, University of Texas at Austin (1969) and "Composition and Properties of Oil Well Drilling Fluids," W. F. Rogers 3rd Ed (1963)—Gulf Publishing Co., Houston, Tex. For water base fluids a hydrophillic organo-silane coating is provided on the additive material, e.g., using a polyoxyalkylene substituted hydrolyzable silane such as $CH_3O(C_2H_4O)_{7.5}C_3H_6Si(OCH_3)_3$.

In the practice of the present invention, suitable caustic reagents, in addition to NaOH, are KOH and $NH_4OH$ and the amounts used to achieve to decreased pH are suitably in the range of 0.5 to 15% by weight of caustic reagent of the amount of asbestos.

What is claimed is:

1. An asbestos base material comprising opened chrysotile asbestos having an outer octahedral magnesia layer and an organo-silane coating bonded thereto and overlying the asbestos base material.

2. A drilling fluid for use in oil and gas drilling operations containing from about 0.10 to 7%, by weight of the material of claim 1.

3. A method for producing organo-silane coated asbestos base material which comprises:
   (i) providing opened untreated chrysotile asbestos material having an outer octahedral magnesia layer intact in an aqueous media at a pH of about 10 to 12;
   (ii) contacting said asbestos material with organo-silane to provide an organo-silane coating on said asbestos material; and
   (iii) recovering the organo-silane coated asbestos base material from the slurry.

4. A method for coating chrysotile asbestos with an organo-silane which comprises:
   (i) providing an aqueous slurry of opened untreated chrysotile asbestos having an outer octahedral magnesia layer intact;
   (ii) treating the slurry with caustic reagent to the extent necessary to provide a pH in the range of about 10 to 12;
   (iii) adding organo-silane to the slurry of step (ii) to thereby provide an organo-silane coating on said asbestos material; and
   (iv) recovering the organo-silane coated chrysotile asbestos from the slurry.

5. An asbestos base material comprising opened chrysotile asbestos having an outer octahedral magnesia layer and an oleophilic organo-silane coating bonded thereto and overlying the asbestos base material.

6. A method for producing oleophilic organo-silane coated asbestos base material which comprises:
   (i) providing opened untreated chrysotile asbestos material having an outer octahedral magnesia layer intact in an aqueous media at a pH of about 10 to 12;
   (ii) contacting said asbestos material with octyl triethoxy silane to provide an oleophilic organo-silane coating on said asbestos material; and
   (iii) recovering the organo-silane coated asbestos base material from the slurry.

* * * * *